United States Patent
Brown et al.

(10) Patent No.: US 8,555,332 B2
(45) Date of Patent: Oct. 8, 2013

(54) SYSTEM FOR ESTABLISHING COMMUNICATIONS WITH A MOBILE DEVICE SERVER

(75) Inventors: William A. Brown, Canton, GA (US); Michael Boatright, Decatur, GA (US); Stephen G. Banner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 385 days.

(21) Appl. No.: 12/860,824

(22) Filed: Aug. 20, 2010

(65) Prior Publication Data
US 2012/0047549 A1    Feb. 23, 2012

(51) Int. Cl.
*H04N 7/16*    (2011.01)

(52) U.S. Cl.
USPC ............ 725/152; 725/133; 725/153; 725/106; 725/112

(58) Field of Classification Search
USPC .......................... 725/133, 152, 153, 106, 112
See application file for complete search history.

(56) References Cited

U.S. PATENT DOCUMENTS

| | | | |
|---|---|---|---|
| 5,761,421 A | 6/1998 | Van Hoff | |
| 6,938,156 B2 | 8/2005 | Wheeler et al. | |
| 7,412,727 B2 | 8/2008 | Kim | |
| 7,430,753 B2 | 9/2008 | Gray | |
| 7,492,899 B2 | 2/2009 | Qiao | |
| 7,634,076 B2 | 12/2009 | Lee et al. | |
| 7,720,986 B2 | 5/2010 | Savoor | |
| 7,756,130 B1 | 7/2010 | Lee | |
| 8,015,253 B1 | 9/2011 | Zapata et al. | |
| 8,108,916 B2 | 1/2012 | Fink et al. | |
| 8,116,808 B2 | 2/2012 | Amine | |
| 8,392,947 B2* | 3/2013 | Grannan et al. | 725/50 |
| 2002/0157002 A1 | 10/2002 | Messerges et al. | |
| 2002/0184301 A1* | 12/2002 | Parent | 709/203 |
| 2003/0051041 A1 | 3/2003 | Kalavade et al. | |
| 2004/0253923 A1 | 12/2004 | Braley | |
| 2005/0010637 A1 | 1/2005 | Dempski et al. | |
| 2005/0044223 A1 | 2/2005 | Meyerson | |
| 2005/0125819 A1* | 6/2005 | Ono et al. | 725/14 |
| 2005/0138192 A1* | 6/2005 | Encarnacion et al. | 709/230 |
| 2005/0235329 A1* | 10/2005 | Karaoguz et al. | 725/81 |
| 2005/0251821 A1* | 11/2005 | Pina | 725/39 |
| 2006/0098593 A1 | 5/2006 | Edvardsen et al. | |
| 2006/0123099 A1* | 6/2006 | Paila et al. | 709/219 |

(Continued)

OTHER PUBLICATIONS

Davies, C., "i-Jetty Turns Android Cellphone Into Mobile Webserver", 6 pages, http://www.phonemag.com/i-jetty-turns-an-droid-cellphone-into-mobile-webserver-031762..., posted Mar. 17, 2008, website last visited Oct. 1, 2010.

(Continued)

*Primary Examiner* — Pankaj Kumar
*Assistant Examiner* — Sahar Baig
(74) *Attorney, Agent, or Firm* — Guntin & Gust, PLC; Ralph Trementozzi

(57) ABSTRACT

A system that incorporates teachings of the present disclosure may include, for example, a computer-readable storage medium operating in a mobile device server having computer instructions to execute a web server application in the mobile device server. The web server application can be operable to cause a media processor to invoke a software application in the mobile device server. The mobile device server can support voice communications over a cellular communication system. Other embodiments are disclosed.

17 Claims, 6 Drawing Sheets

(56) References Cited

U.S. PATENT DOCUMENTS

| | | | |
|---|---|---|---|
| 2006/0172700 A1* | 8/2006 | Wu | 455/41.2 |
| 2006/0193456 A1 | 8/2006 | Light et al. | |
| 2006/0271968 A1* | 11/2006 | Zellner | 725/81 |
| 2007/0019670 A1 | 1/2007 | Falardeau | |
| 2007/0022469 A1 | 1/2007 | Cooper | |
| 2007/0055783 A1 | 3/2007 | Gourraud | |
| 2007/0097860 A1* | 5/2007 | Rys et al. | 370/229 |
| 2007/0142036 A1 | 6/2007 | Wikman et al. | |
| 2007/0157281 A1* | 7/2007 | Ellis et al. | 725/134 |
| 2008/0195406 A1 | 8/2008 | Matsumoto | |
| 2008/0320534 A1 | 12/2008 | Wang et al. | |
| 2009/0019492 A1* | 1/2009 | Grasset | 725/45 |
| 2009/0031360 A1 | 1/2009 | Kidd et al. | |
| 2009/0063193 A1 | 3/2009 | Barton et al. | |
| 2009/0088197 A1 | 4/2009 | Stewart | |
| 2009/0089183 A1 | 4/2009 | Afram et al. | |
| 2009/0093237 A1* | 4/2009 | Levenshteyn et al. | 455/412.1 |
| 2009/0106366 A1 | 4/2009 | Virtanen et al. | |
| 2009/0171985 A1 | 7/2009 | Tischer | |
| 2009/0193486 A1 | 7/2009 | Patel et al. | |
| 2009/0282098 A1* | 11/2009 | Karaoguz et al. | 709/203 |
| 2009/0288122 A1 | 11/2009 | Zellner | |
| 2009/0298514 A1* | 12/2009 | Ullah | 455/456.5 |
| 2009/0327702 A1 | 12/2009 | Schnell | |
| 2009/0328118 A1* | 12/2009 | Ravishankar et al. | 725/106 |
| 2009/0328228 A1 | 12/2009 | Schnell | |
| 2010/0031298 A1* | 2/2010 | Iwanami et al. | 725/80 |
| 2010/0031366 A1 | 2/2010 | Knight et al. | |
| 2010/0052853 A1 | 3/2010 | Hilton | |
| 2010/0058398 A1 | 3/2010 | Ojala et al. | |
| 2010/0071021 A1 | 3/2010 | Friedman | |
| 2010/0076274 A1 | 3/2010 | Severson | |
| 2010/0197238 A1 | 8/2010 | Pathuri et al. | |
| 2010/0275249 A1 | 10/2010 | McCann et al. | |
| 2010/0328547 A1 | 12/2010 | Mayorga | |
| 2011/0022522 A1 | 1/2011 | Sege | |
| 2011/0130118 A1 | 6/2011 | Fan | |
| 2011/0197264 A1 | 8/2011 | McDade | |
| 2011/0258437 A1 | 10/2011 | Mckelvey | |
| 2012/0084834 A1 | 4/2012 | Brown | |

OTHER PUBLICATIONS

Lin, et al., "On Controlling Digital TV Set-Top-Box by Mobile Devices via IP Network", 8 pages, Proceedings of the Seventh IEEE International Symposium on Multimedia (ISM '05), Computer Society, 2005.

Linux Devices, "Intel 'Personal Server' Research: Mobile Computing in the Palm of your Hand", pp. 1-4, http://www.linuxfordevices.com/c/a/Linux-For-Devices-Articles/Intel-Personal-Server-res . . . , website last visited Oct. 1, 2010.

Opensource, "MWS: Rationale—A Website on a Mobile Computing in the Palm of your Hand", pp. 1-4, http://wiki.opensource.nokia.com/projects/MWS:Rationale, website last visited Oct. 1, 2010.

Soroko, Jonathan, "Web Server on Your Cellphone—a New Design Space", pp. 1-4, Popular Logistics, Feb. 16, 2010.

Toorani, et al.. "LPKI—A Lightweight Public Key Infrastructure for the Mobile Environments", pp. 162-166, IEEE 2008, ICCS 2008.

Wikipedia, "Mobile Web Server (Symbian OS)", 1 page, http://en.wikipedia.org/wiki/Mobile_Web_Server_(Symbian_Os), website last visited Oct. 1, 2010.

Wikipedia, "Mobile Web Server", pp. 1-3, website last visited Oct. 1, 2010.

Zimmerly, Bill, "A Tiny Cloud in Android", 17 pages article, website last visited Oct. 1, 2010, http://www.ibm.com/developerworks/opensources/library/os-tinycloud/index.html.

Rendon, et al., "Architecture for Web Services Access from Mobile Devices", Web Congress, LA-WEB 2005, Third Latin American, 2005.

* cited by examiner

200

600

SYSTEM FOR ESTABLISHING COMMUNICATIONS WITH A MOBILE DEVICE SERVER

FIELD OF THE DISCLOSURE

The present disclosure relates generally to device communication techniques and more specifically to a system for establishing communications with a mobile device server.

BACKGROUND

Media communication systems such as interactive television (iTV) systems can deliver media content to media processors such as set-top boxes (STBs). Generally, media content can be broadcast by these systems and delivered according to the type of services users have subscribed to. In interactive media communication systems, users can also request services on demand. Portable media devices such as mobile phones or media players such as the iPod™ can also be adapted to communicate with media processors over a wireless medium. The combined services of portable and fixed media devices can provide users a rich environment for utilizing multimedia services.

DETAILED DESCRIPTION

The present disclosure describes, among other things, illustrative embodiments of a mobile device server for establishing communications and exchanging messages with media devices capable of supplying media content of various forms.

One embodiment of the present disclosure includes a portable telephone having a controller to execute a web server application in the portable telephone. The web server application can be operable to detect a set-top box (STB), and transmit a message to a server by way of a gateway assigned to a first Internet Protocol (IP) responsive to detecting the STB. The server can operate in an interactive television network remote from a location of the STB. The message can include an identifier of a software application in the portable telephone and a second IP address associated with the software application. The server can be operable to identify the STB and media services assigned thereto according to the first IP address of the gateway, and direct the STB to invoke the software application in the portable telephone according to the second IP address. The web server application can further be operable to receive a request from the STB to execute the software application according to the second IP address, and execute the software application to establish media communication services between the portable telephone and the STB.

One embodiment of the present disclosure includes a server having a controller to receive a message from a web server application operating in a portable telephone by way of a gateway communicatively coupled to the server, detect an identifier of the gateway, and establish communications with a media processor according to the identifier of the gateway; and direct the media processor to invoke the software application in the portable telephone according to the IP address. The message can include a request to invoke a software application in the portable telephone, and wherein the software application is associated with an Internet Protocol (IP) address.

One embodiment of the present disclosure includes a non-transitory computer-readable storage medium operating in a mobile device server having computer instructions to execute a web server application in the mobile device server. The web server application can be operable to cause a media processor to invoke a software application in the mobile device server. The mobile device server can support voice communications over a cellular communication system.

Figure 1:
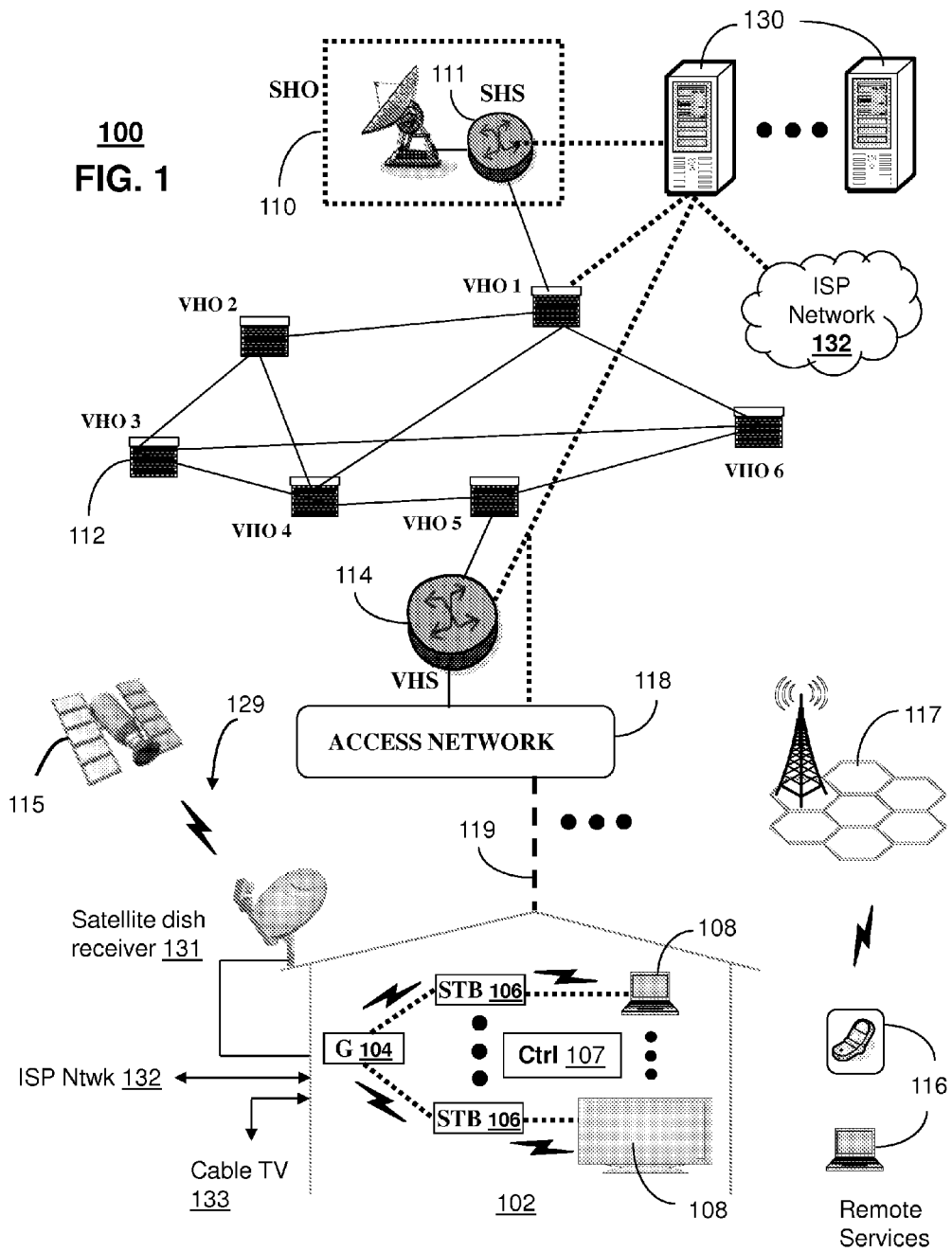
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a common satellite dish receiver 131 coupled to the building 102. Modulated signals received by the satellite dish receiver 131 can be transferred to the media processors 106 for decoding and distributing broadcast channels to the media devices 108. The media processors 106 can be equipped with a broadband port to the ISP network 132 to enable services such as VoD and EPG described above.

In yet another embodiment, an analog or digital cable broadcast distribution system such as cable TV system 133 can be overlaid, operably coupled with, or replace the IPTV system and/or the satellite TV system 129 as another representative embodiment of communication system 100. In this embodiment the cable TV system 133 can provide Internet, telephony, and interactive media services also.

It is contemplated that the present disclosure can apply to any present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116. The portal services can be provided using various components and/or techniques, including by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

System 100 can provide for all or a portion of the computing devices 130 to function as a remote server (herein referred to as server 130). The server 130 can use common computing and communication technology to perform the function of processing requests generated by a web server application operating in portable communication devices, such as those shown in reference 108 or 116 as will be described further below.

Figure 2:
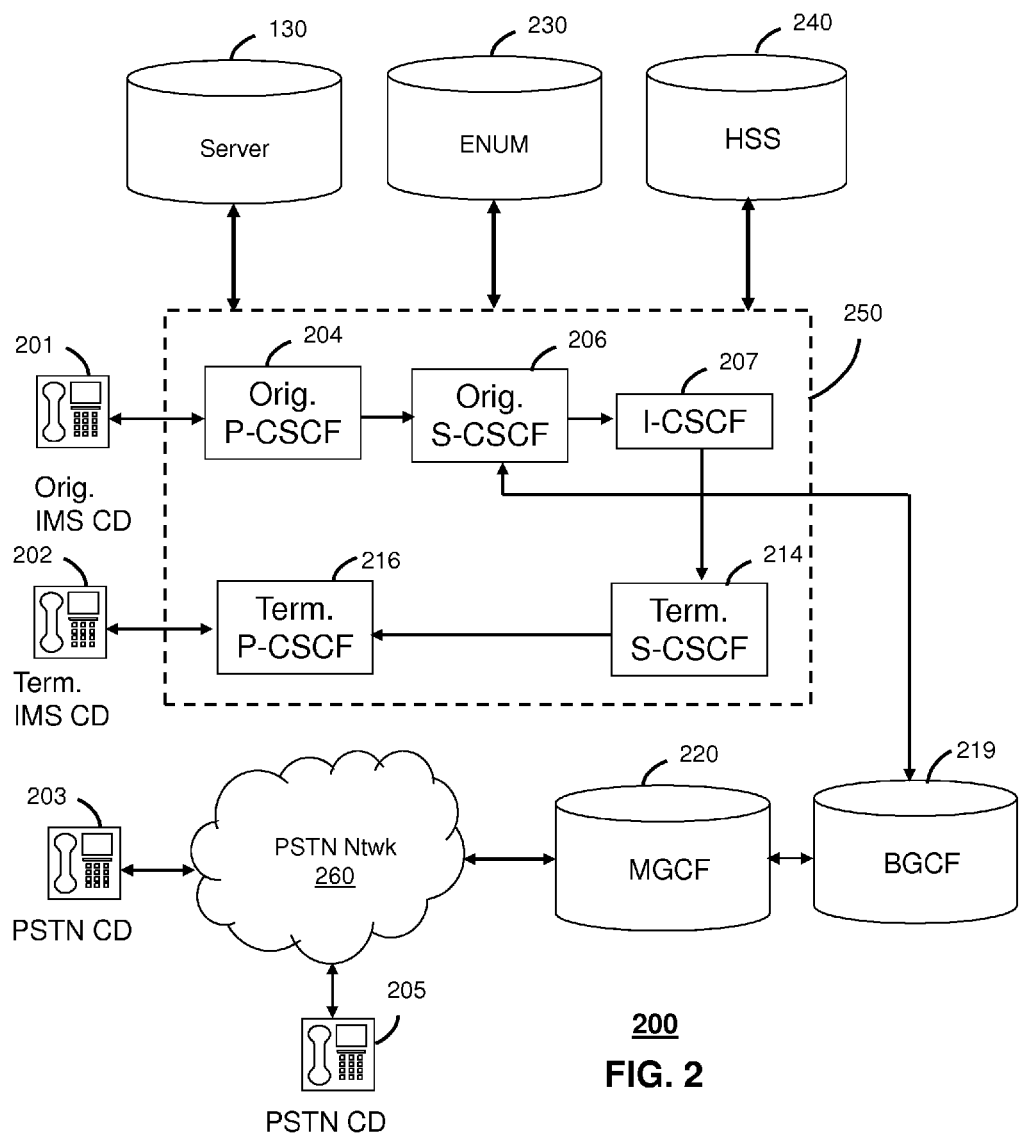

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

System 200 can include or otherwise be coupled with server 130 of FIG. 1 for purposes similar to those described above. It is further contemplated by the present disclosure that a web server can operate from any of the communication devices (e.g., references 201, 202, 203, and 205) depicted in FIG. 2 as will be described below.

Figure 3:
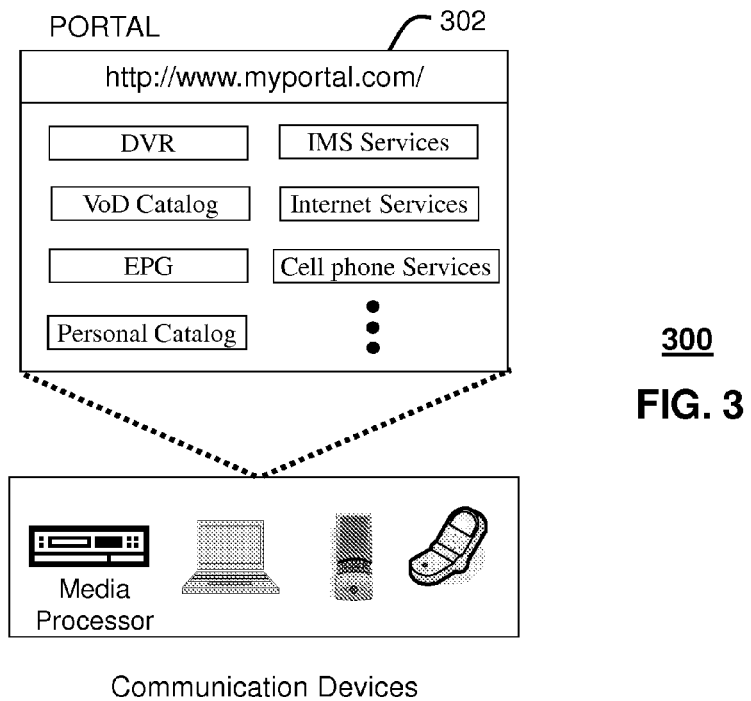
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

It is contemplated by the present disclosure that the web portal 302 can be utilized to manage operations of a mobile device server and/or operate as a remote server as described below.

Figure 4:
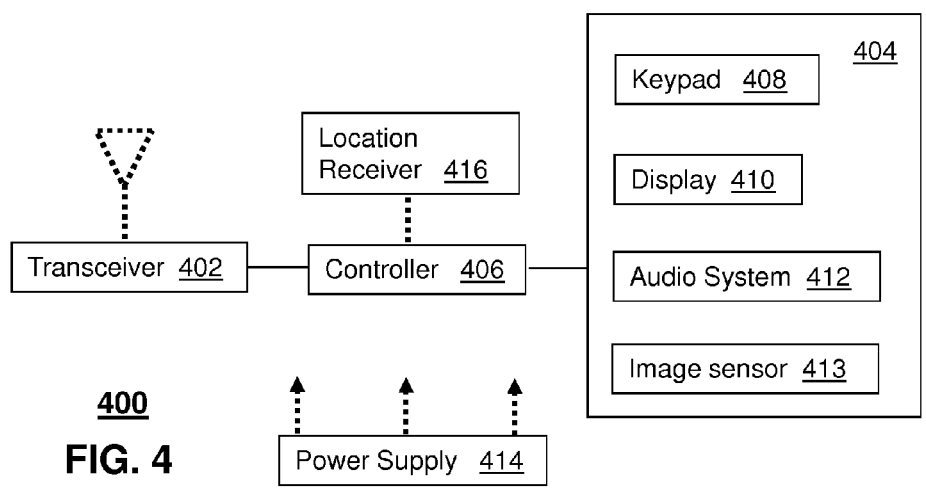
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player. It is further contemplated by the present disclosure that the communication device 400 can operate as a mobile device server from which a web server application operates as described below.

Figure 5:
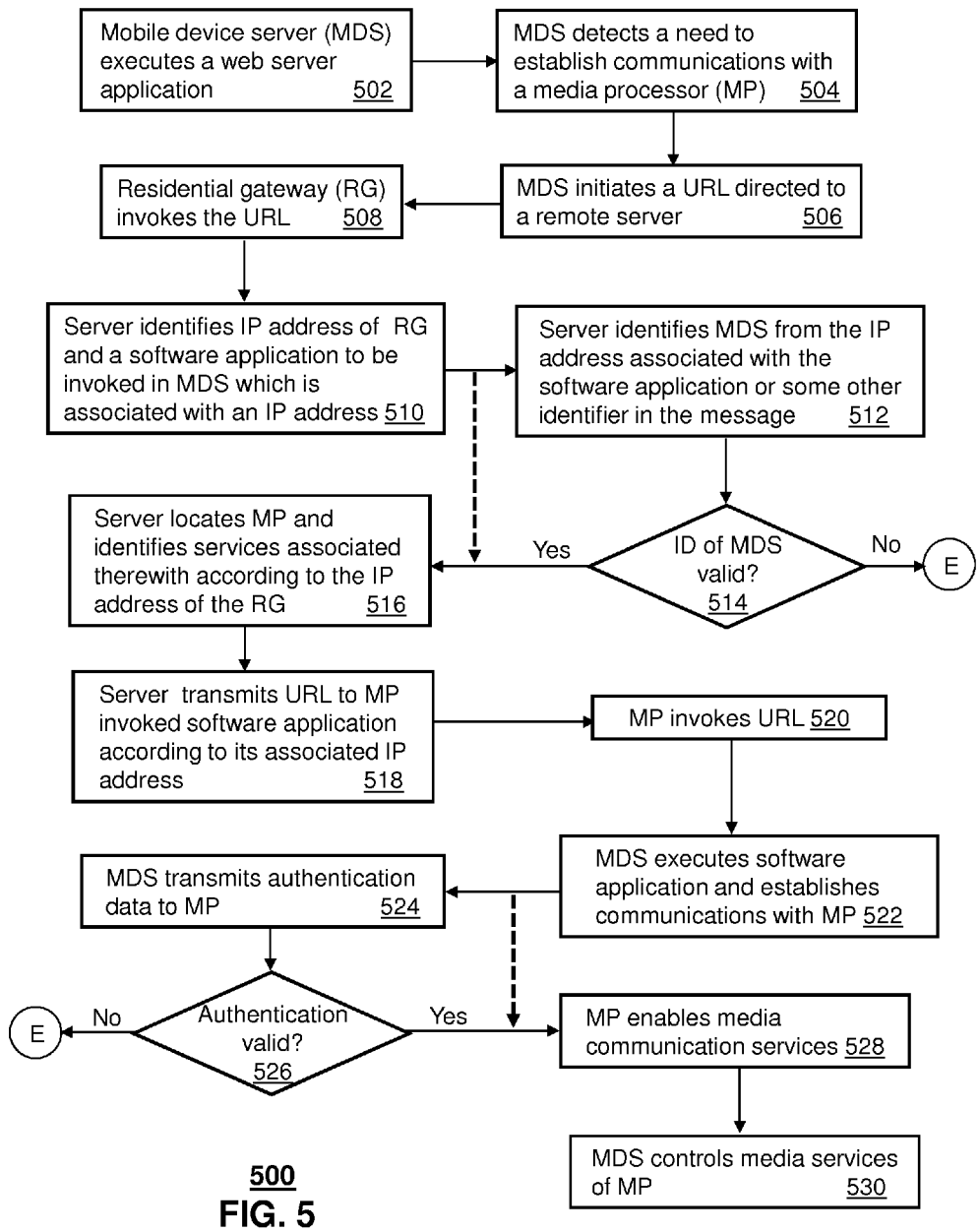
FIG. 5 depicts an illustrative embodiment of a method operating in portions of the systems described in FIGS. 1-4.
Figure 6:
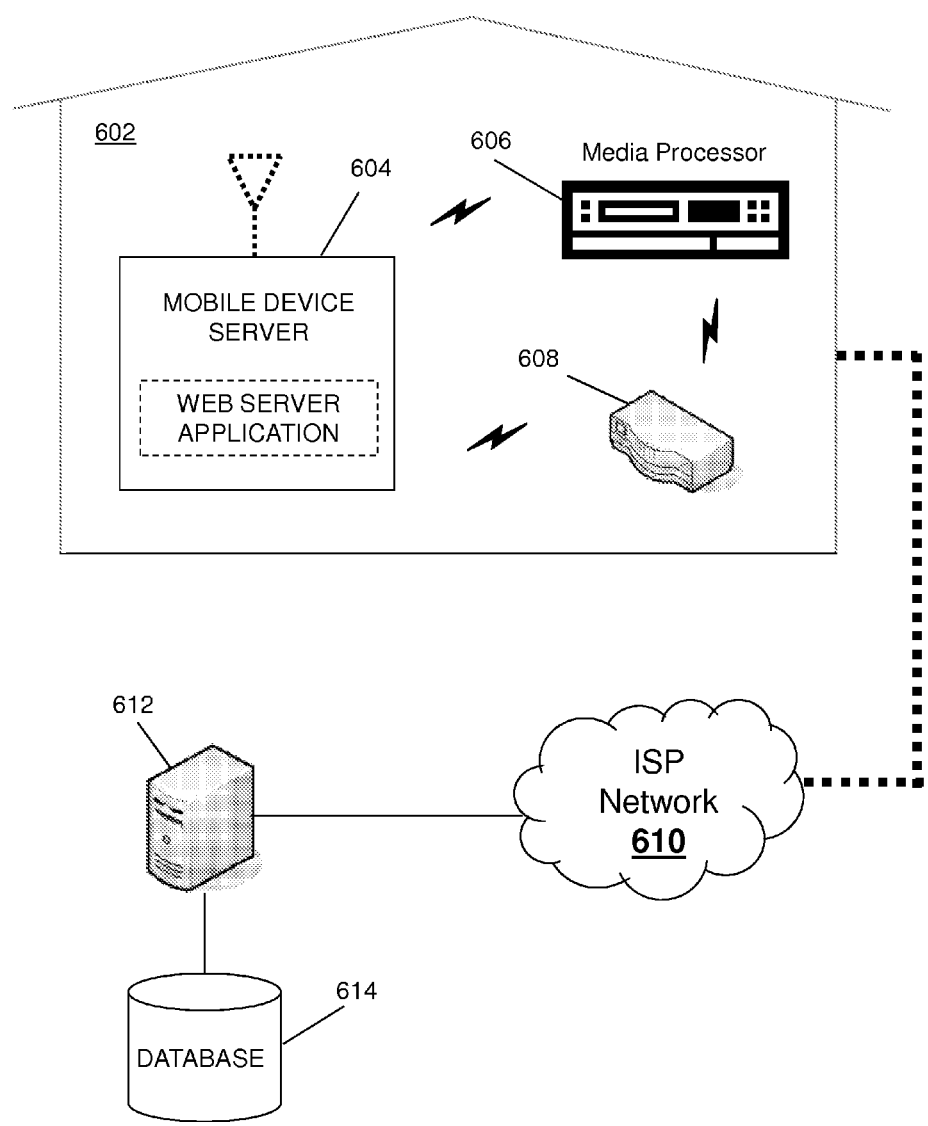
FIG. 6 depicts an illustrative embodiment of a system operating according to the method of FIG. 5.

FIG. 5 depicts illustrative embodiments of a method 500 that operates in portions of the devices of FIGS. 1-4. Method 500 can begin with step 502 in which a mobile device server 604 such as shown in FIG. 6 executes a web server application. Step 502 can be initiated by a user manipulating the user interface of the mobile device server 604, or can be automatically initiated by other triggers (e.g., time of day, user profile, or combinations thereof). The mobile device server 604 can represent a portable telephone such as a cellular telephone or cordless telephone comprising in whole or in part the components of the communication device shown in FIG. 4 and described in accompanying text. It will be appreciated that the mobile device server 604 can be any type of portable telephony device which can execute a web server application. Other embodiments of the mobile device server 604 such as an iPAD™ or a Personal Digital Assistant (PDA) executing a web server application are therefore contemplated by the present disclosure. For illustration purposes, the present disclosure will make references to the components shown in FIG. 4 when discussing the operations of the mobile device server 604.

A web server application can represent a hypertext transfer protocol (HTTP) web server application implemented in software, hardware or combinations thereof operating from the controller 406 of the mobile device server 604. A web server application can also be represented by any web server application used by a server or hosting computer system. Accordingly, any type of web server application operational in a mobile device server 604 is contemplated by the present disclosure.

With this in mind, attention is redirected to FIG. 5. The web server application in the mobile device server 604 can be operable to detect in step 504 a need to establish communications with a media processor 606 such as the STB 106 shown in FIG. 1. Step 504 can represent the web server application of the mobile device server 604 scanning for media resources in building 602 by way of a residential gateway 608 providing access to a wireless network. The residential gateway 608 can be a WiFi router and modem combination which is communicatively coupled to an Internet Service Provider (ISP) network 610 by way of a wired interface such as a coaxial cable or telephone wire interface.

The web server application of the mobile device server 604 can scan for the presence of media resources such as the media processor 606 by requesting information from the residential gateway 608. The residential gateway 608 can transmit to the mobile device server 604 a list of the active devices on the WiFi network. Alternatively, or in combination, the web server application of the mobile device server 604 can transmit a broadcast message on the WiFi network requesting identification of the devices communicatively coupled to the WiFi network. Other identification techniques are contemplated by the present disclosure.

Once the media processor 106 has been discovered by the web server application operating from the mobile device server 604, the web server application can present the detected media resource(s) to a user over the UI 404 of the mobile device server 604. The user can manipulate the UI 404 as previously described to indicate a desire to establish communications with the media processor 606, thereby establishing the need described in step 504 of FIG. 5. Alternatively, or in combination, the need to establish communications with the media processor 606 can be detected from a prior history of user actions, a profile established by the user of the mobile device server 606 indicating a preference for establishing communications with the media processor 606, or any other triggers that may be definable by user behavior or user established settings.

In step 506, the web server application in the mobile device server 604 can initiate a URL directed to the remote server 612 by way of the residential gateway 608. The following URL is an illustrative embodiment of a URL that can be initiated by the mobile device server 604:

http://someServer.com/launchApp?special app=http://<IP address of MDS x.x.x.x>/mrml.xml.

The illustrative URL can include a domain name of the remote server 612 and instructions to launch a specific software application executable by the web server application in the mobile device server 604. The URL can also include an IP address of the mobile device server 604 which can be used to launch the software application.

In step 508, the residential gateway 608 can invoke the URL and insert therewith the IP address assigned to the residential gateway 608. The server 612 can receive the URL message by way of the ISP network 610 of FIG. 6. The server 612 can in turn identify in step 510 from an HTTP header of the URL message the IP address of the residential gateway 608. The server 612 can also identify from the URL message the software application to be invoked at the mobile device server 604 (e.g., special_app), and the IP address associated with the software application which can be used to identify the software application and/or the mobile device server 604.

In step 512, the remote server 612 can authenticate the request from the mobile device server 604 with the IP address of the mobile device server 604 or some other identifier added to the URL message (e.g., MAC address of the mobile device server 604). If the server 612 does not recognize the mobile device server 604 in step 614, method 500 can cease. Otherwise, if authentication is successful, the server 612 can proceed to step 516. Authentication of the mobile device server 604 can be delegated to the media processor 606, in which case steps 512 and 514 would be bypassed.

At step 516, the server 612 can be operable to locate the media processor 606 and media services associated therewith according to the detected IP address of the residential gateway 608. The server 612 can locate the media processor 606 from a look-up table in a database 614 operating as a Domain Name Server (DNS), a subscriber database, or combinations thereof. Once the media processor 606 and services associated therewith have been identified, the server 612 can transmit to the media processor 606 in step 518 a URL message to invoke the software application in the mobile device server 604 according to the IP address of the mobile device server 604. The following is an illustrative embodiment of a URL message that can be transmitted to the media processor 606: http://<IP address of MDS x.x.x.x>/mrml.xml.

Once the media processor 606 invokes this URL in step 520, the web server application in the mobile device server 604 can be operable to execute the software application in step 522 and thereby establish an initial state of communications with the media processor 606. Authentication of the mobile device server 604 can take place in steps 524-526 prior to enabling media communication services between the mobile device server 604 and the media processor 606. In step 524, the mobile device server 604 can transmit authentication data to the media processor 606. The authentication data can comprise, for example, a security key provided by the service provider of the interactive communication systems of FIGS. 1-2. The security key can be encrypted data, a public key infrastructure (PKI) key, a personal identification number (PIN), login or password, or other form of security technology. The security key can be utilize to prevent mobile device servers 604 from utilizing media services of the communication systems of FIGS. 1-2 unless authorized by the service provider of these systems.

If the authentication data is invalid or not recognized, method 500 ceases. Otherwise, the media processor 606 proceeds to step 528 where it enable media communication services between the mobile device server 604 and the media processor 606. Media communication services can conform to a markup language such as multimedia retrieval markup language (MRML) or an extensible markup language (XML). Other markup languages are contemplated by the present disclosure. In step 530, the web server application operating in the mobile device server 604 can control media services of the media processor with an exchange of markup language instructions transmitted over the WiFi network in the premises 602. The web server application, for example, can direct the media processor 606 to store and/or present media content supplied by the mobile device server 604, or can request media content from the media processor 606. Other exchanges between the mobile device server 604 and the media processor 606 are contemplated by the present disclosure.

The aforementioned disclosure contemplates a mobile device server 604 that among other things is capable of detecting media resources which it can prompt by way of a server 612 to invoke one or more software applications operating from the mobile device server 604. By mobilizing a web server by way of a mobile device server 604 as described above it is no longer necessary for media resources to be managed exclusively by way of infrastructure devices such as those shown in FIGS. 1-3, which are generally not portable.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that a mobile device server 604 can communicate with other mobile device servers. In this configuration one of the mobile device servers 604 can function in part as the media processor 606 of FIG. 6. The remote server 612 can perform the functions of FIG. 5 depending on the functions of each of the mobile device servers 604.

Other suitable modifications can be applied to the present disclosure without departing from the scope of the claims below. Accordingly, the reader is directed to the claims section for a fuller understanding of the breadth and scope of the present disclosure.

Figure 7:
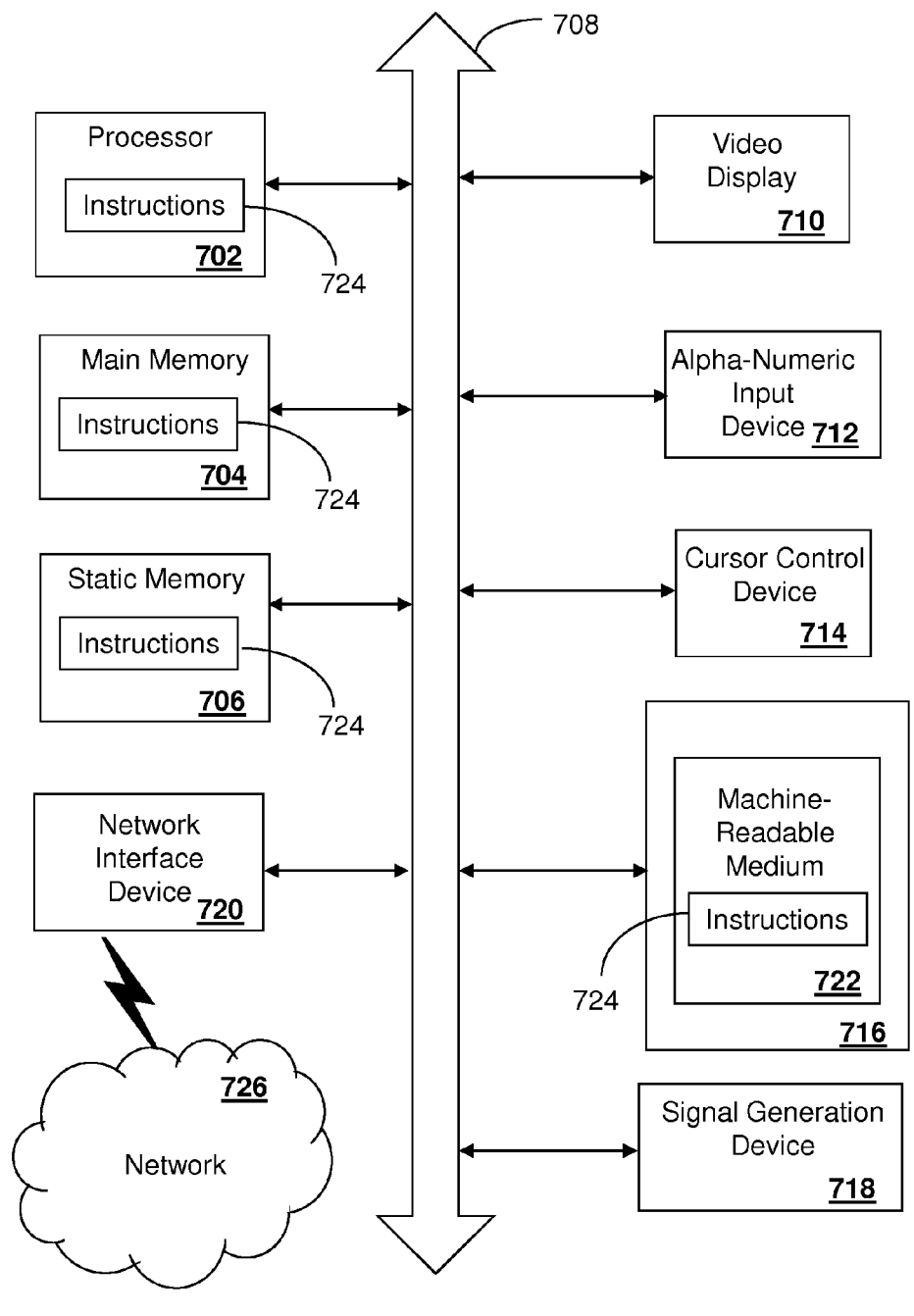
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. The machine can operate, for example, as the mobile device server 604, the media processor 606, the gateway 608, the remote server 612, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable device, comprising: a memory to store instructions; and a controller in communication with the memory, wherein the controller, responsive to executing the instructions, executes a web server application in the portable device, wherein the web server application is operable to perform first operations comprising:

detecting a set-top box; and transmitting, responsive to the detecting of the set-up top box, a message to a server by way of a gateway, wherein the gateway is in wireless communication with the controller and assigned to a first internet protocol address, wherein the server operates in an interactive television network remote from a location of the set-top box, and wherein the message comprises an identifier of a software application of the portable device and a second internet protocol address associated with the software application;

wherein the message causes the server to perform second operations comprising:

identifying the set-top box and media services assigned thereto by way of the first internet protocol address of the gateway, and directing the set-top box to invoke the software application in the portable device by way of the second internet protocol address, wherein the first operations further comprise:

receiving a request from the set-top box to execute the software application by way of the second internet protocol address; and executing the software application to establish media communication services between the portable device and the set-top box.

2. The portable device of claim 1, wherein the web server application corresponds to a hypertext transfer protocol server.

3. The portable device of claim 1, wherein the media communication services between the portable device and the set-top box conform in part to a markup language.

4. The portable device of claim 3, wherein the markup language corresponds to an extensible markup language.

5. The portable device of claim 1, wherein the message comprises a uniform resource locator with a plurality of descriptors that identify the software application and the second internet protocol address.

6. The portable device of claim 1, wherein the transmitting of the message causes the gateway to insert the first internet protocol address into an hypertext transfer protocol header of the message.

7. The portable device of claim 1, wherein the web server application manages operations of the set-top box responsive to establishing the media communication services between the portable device and the set-top box.

8. The portable device of claim 1, wherein the portable device is selected from a group consisting of: a portable telephone; a cellular telephone; a cordless telephone; a media player; a gaming console; a personal digital computer; a personal computer; a table computer; and a laptop computer, and wherein the web server application submits a request to the set-top box to receive streaming media content.

9. The portable device of claim 1, wherein the web server application transmits authentication data to the set-top box to enable the media communication services between the portable device and the set-top box.

10. The portable device of claim 1, wherein the message comprises an identifier of the portable device to enable the server to authorize a request submitted by the web server application to establish the media communication services between the portable device and the set-top box.

11. A server, comprising: a memory to store computer instructions; and a controller in communication with the memory, wherein the controller, responsive to executing the computer instructions, performs operations comprising: receiving a message transmitted from a web server application operating in a portable device, wherein the message is transmitted in response to the portable device detecting a set-top box and by way of a gateway in wireless communication with the portable device and communicatively coupled to the server, wherein the web server application in the portable device detects a request to establish media communication services with a media processor and transmits the message to the server responsive to the request; detecting an identifier of the gateway, wherein the message comprises a request to invoke a software application in the portable device, and wherein the software application is associated with an internet protocol address; establishing communications with the media processor by way of the identifier of the gateway; and directing the media processor to invoke the software application in the portable device by way of the internet protocol address supplied by the web server application, wherein invocation of the software application in the portable device causes the portable device to perform second operations comprising: executing the software application by way of the internet protocol address; and establishing media communication services with the media processor responsive to executing the software application.

12. The server of claim 11, wherein the web server application of the portable device comprises the software application, and wherein the portable device is selected from a group consisting of: a portable telephone; a cellular telephone; a cordless telephone; a media player; a gaming console; a personal digital computer; personal computer; a tablet computer; and a laptop computer.

13. The server of claim 11, wherein the media communications services between the portable device and the media processor conform to a multimedia retrieval markup language.

14. The server of claim 11, wherein the identifier of the gateway comprises a first internet protocol address assigned to the gateway.

15. The server of claim 11, wherein the web server application corresponds to a hypertext transfer protocol server application operating in the portable device.

16. A computer-readable storage device, comprising computer instructions which, responsive to being executed by a processor, cause the processor to perform operations comprising executing a web server application in a mobile device server, wherein the web server application causes a media processor to invoke a software application in the mobile device server by transmitting a message to a remote server in response to detecting the media processor, wherein the message is transmitted by way of a gateway in wireless communication with the mobile device server, wherein the mobile device server supports voice communications over a cellular communication system, wherein the message comprises a first internet protocol address located in a hypertext transfer protocol header of the message, and an identifier of a software application associated with a second internet protocol address, and wherein the transmitting of the message to the remote server causes the remote server to perform second operations comprising: establishing communications with the media processor by way of the first internet protocol address; and directing the media processor to invoke the software application in the mobile device server by way of the second internet protocol address, wherein the web server application receives a request from the media processor to execute the software application by way of the second internet protocol address, and wherein the web server application executes the software application to establish media communication services between the mobile device server and the media processor.

17. The computer-readable storage device of claim 16, wherein the mobile device server comprises a device selected from a group consisting of: a portable telephone; a cellular telephone; a cordless telephone; a media player; a gaming console; a personal digital computer; a personal computer; a tablet computer; and a laptop computer, and wherein the media processor comprises a set-top box, a computer, a gaming console or a media player.

* * * * *